United States Patent
Shimamune et al.

[11] Patent Number: 6,126,796
[45] Date of Patent: Oct. 3, 2000

[54] ELECTROLYTIC CELL AND METHOD FOR THE PRODUCTION OF ACID WATER

[75] Inventors: Takayuki Shimamune, Tokyo; Masashi Tanaka, Kanagawa; Yasuo Nakajima, Tokyo; Yoshinori Nishiki, Kanagawa, all of Japan

[73] Assignee: Permelec Electrode Ltd., Kanagawa, Japan

[21] Appl. No.: 09/081,059

[22] Filed: May 19, 1998

[30] Foreign Application Priority Data

May 19, 1997 [JP] Japan ................................. 9-144675

[51] Int. Cl.⁷ .................................................. C02F 1/461
[52] U.S. Cl. .................................................. 204/263
[58] Field of Search ................................. 264/263

[56] References Cited

U.S. PATENT DOCUMENTS

| | | | |
|---|---|---|---|
| 4,626,327 | 12/1986 | McCarthy et al. | 204/263 |
| 4,767,511 | 8/1988 | Aragon | 204/263 |
| 5,965,009 | 10/1999 | Shimamune et al. | 204/263 |

*Primary Examiner*—Arun S. Phasge

*Attorney, Agent, or Firm*—Sughrue, Mion, Zinn, Macpeak & Seas, PLLC

[57] ABSTRACT

An electrolytic cell for the production of acid water which performs simple operation to produce acid water without complicated control over the concentration of hydrochloric acid to be added or precipitation of alkaline earth metal salts, which are disadvantages of the prior art electrolysis for the production of acid water. An electrolytic cell for the production of acid water, which comprises a power supply for applying a voltage across an anode chamber and a cathode chamber partitioned by an ion-exchange membrane. The anode in the anode chamber is disposed in close contact with the ion-exchange membrane. The electrolytic cell further comprises means for supplying an aqueous solution of hydrochloric acid and water to the cathode chamber and the anode chamber, respectively. Hydrochloric acid is not directly added to the anode chamber but indirectly added to the anode chamber by diffusing through the ion-exchange membrane. In this manner, hydrochloric acid is uniformly dispersed into the anode chamber by diffusing through the ion-exchange membrane. Thus, the need for controlling concentration is eliminated. Furthermore, because both the catholyte and anolyte are kept acidic, no precipitation of metal salts occurs.

9 Claims, 1 Drawing Sheet

ELECTROLYTIC CELL AND METHOD FOR THE PRODUCTION OF ACID WATER

FIELD OF THE INVENTION

The present invention relates to an electrolytic cell for the production of a high purity acid water free of metallic contaminants. The high purity acid water is useful in disinfection or sterilization, or for cleaning electronic apparatus such as semiconductors and liquid crystals.

BACKGROUND OF THE INVENTION

Recently, a technique has been proposed for electrolyzing water comprising a salt containing a slight amount of chlorine, e.g., sodium chloride or ammonium chloride, to obtain an oxidizing electrolytic solution having an extremely high oxidation-reduction potential. This electrolytic solution is known to exhibit very strong bactericidal and disinfectant activities, as well as cleaning activity and grain cohesion activity. Furthermore, the electrolytic solution which has been used for these purposes contains chloride ion only in almost the same concentration as ordinary tap water, and thus can be discharged as such without causing secondary pollution. Therefore, this electrolytic solution has recently found wide application, e.g., in hospital lavatories, in the cleaning of precision machines, and in the cleaning of semiconductors or liquid crystals.

A so-called strongly acidic water is required instead of mere acid water depending on the intended application of the acid water. Strongly acidic water is water or an aqueous solution having a pH value of not more than 3 and an ORP of not less than 1,000 mV. It is relatively easy to electrolytically produce an electrolytic solution having an ORP of not less than 1,000 mV. However, it is relatively difficult to electrolytically produce an electrolytic solution having a pH value of not more than 3. For example, the production of strongly acidic water by the electrolysis of an electrolytic solution containing chloride ion requires a reduction in pH by electrolysis by hundreds of times that required for producing hypochlorous acid by oxidizing chloride ion.

In other words, when a solution of a neutral salt such as a chloride is electrolyzed, the ORP of the electrolytic solution thus obtained is determined by the concentration of hypochlorous acid. The concentration of hypochlorous acid may be from about 1 to 5 ppm. If the concentration of hypochlorous acid exceeds the above defined range, chlorine gas is produced. Assuming that the current efficiency for producing chlorine gas is about 10%, the acidity of the electrolytic solution thus produced is not sufficient as represented by a pH of from 4 to 5. This is due to hydrochloric acid produced by the disproportionation reaction $Cl_2 + H_2O \rightarrow HCl + HClO$ and hydrogen ion produced by the decomposition of water $H_2O \rightarrow H^+ + OH^-$ (cathode). In order to attain the desired pH value of 3 or lower, extra water electrolysis which neglects the current efficiency of chlorine production is required. Thus, extra electrolysis is required taking into account the chloride ion concentration.

This problem is no longer being studied and has been avoided by increasing the scale of electrolysis. However, raw water having an extremely low electric conductivity such as pure water and ultrapure water is required for semiconductor manufacturing. This requires a further increase in electric power. Furthermore, because prior art electrolytic systems had a small current density, a large electrode surface area was required. Because this electrode contacts the electrolytic solution, it is likely that the electrode component, which is a metal, further contaminates the system. This in turn contaminates the product solution by metallic components, which are the most undesirable type of contaminant.

In order to solve these problems, the present inventors proposed an electrolytic process which comprises applying a voltage across an anode and a cathode disposed in close contact with an ion-exchange membrane as a diaphragm such that the ion-exchange membrane acts as a solid electrolyte. In accordance with this electrolytic process, even if the current density is raised about ten times, e.g., to not less than 10 A/dm$^2$, the required electrolytic voltage can be kept at a few volts. This makes it possible to effect electrolysis at a far lower voltage than in the prior art. Furthermore, the increase in current density makes it possible to reduce the required number of electrodes and hence reduce the size of the apparatus. In accordance with this process, electrolysis with the addition of a slight amount of an acid or salt makes it possible to obtain an acidic water having a high ORP, namely acid water from the anode chamber.

Although these conditions are useful for producing acid water for cleaning or bactericidal use, even further water electrolysis is required to lower the pH value of the acid water thus produced. Thus, the total required amount of electrolytic current remains much the same as in the prior art. Because the required electrolysis is excessive, contamination can easily occur. Even if this system can provide satisfactory properties at present, further improvements are needed when even more precise conditions are required.

Furthermore, this system is disadvantageous in that it takes too long to make adjustments during the dissolution of sodium chloride or the like in the anolyte. In other words, if sodium chloride is excessively added to the anolyte, the properties of the electrolytic solution can change and the excess sodium chloride or other salts can cause contamination. On the contrary, if sodium chloride or other salts are insufficiently added to the anolyte, the desired properties can hardly be obtained. In order to obtain the desired properties, prolonged electrolysis is required.

The present inventors also proposed a process of electrolysis in which an acidic chloride is supplied to the anode chamber. This process solves many prior art problems and reduces the size of the electrolytic cell. This proposal further makes it possible to reduce the required electric current to not more than $\frac{1}{100}$ of the prior art systems. However, this process requires the addition of a chemical liquid such as hydrochloric acid having a controlled concentration to the anode chamber. This is disadvantageous in that it is necessary to uniformly diffuse a very dilute hydrochloric acid solution or the like throughout the anolyte, thus requiring a complicated control mechanism.

SUMMARY OF THE INVENTION

It is therefore an object of the present invention to provide an electrolytic cell and method for the production of acid water which can provide better handleability and maintenance as compared to prior art systems.

The foregoing object of the present invention will become more apparent from the following detailed description and Examples.

The above object of the present invention is achieved by providing an electrolytic cell for the production of acid water, which comprises an ion-exchange membrane partitioning the electrolytic cell into a cathode chamber containing a cathode and an anode chamber containing an anode disposed in close contact with said ion-exchange membrane, a power supply for applying a voltage across the anode chamber and the cathode chamber, means for supplying an aqueous solution of hydrochloric acid to said cathode chamber, and means for supplying water to said anode chamber.

The above object of the present invention is also achieved by providing an electrolysis method for producing acid water using an electrolytic cell which comprises an ion-exchange membrane partitioning the electrolytic cell into a cathode chamber containing a cathode and an anode chamber containing an anode disposed in close contact with said ion-exchange membrane, which method comprises applying a voltage across the anode chamber and the cathode chamber while supplying an aqueous solution of hydrochloric acid to said cathode chamber and supplying water to said anode chamber, and recovering an oxidizing acid water containing hypochlorous acid from said anode chamber.

BRIEF DESCRIPTION OF THE DRAWINGS

By way of example and to make the description more clear, reference is made to the accompanying drawings in which.

DETAILED DESCRIPTION OF THE INVENTION

Figure 1:
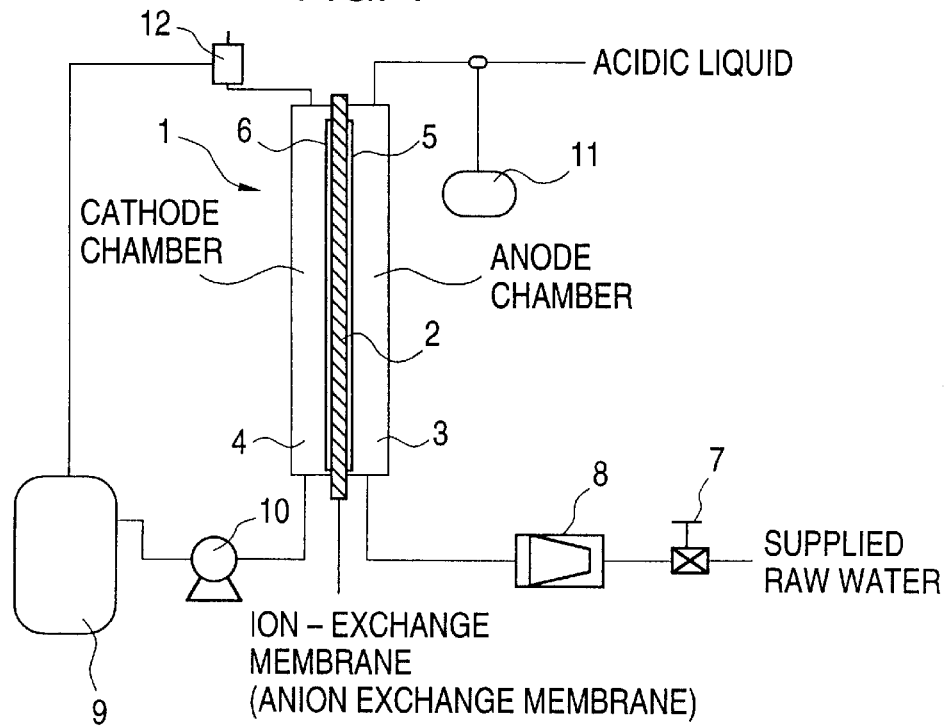
FIG. 1 is a schematic longitudinal sectional view illustrating an embodiment of the electrolytic cell for the production of acid water according to the present invention.

The present invention will be further described below.

In the present invention, an acidifying chemical liquid such as hydrochloric acid is added to the catholyte instead of the anolyte as effected in the prior art so that it is indirectly added to the anolyte by diffusing through an ion-exchange membrane. This eliminates the necessity of complicated control over the concentration of the chemical liquid, thus making it possible to disperse the chemical liquid more uniformly in the anolyte.

The anolyte supplied to the anode chamber may be raw water such as city water, pure water and ultrapure water free of additives depending on the intended use of the anodized acid water thus obtained. Accordingly, no control is required over the concentration of additives that are to be added to the anolyte.

Chloride ion, acid for lowering pH and other ingredients which are essential in the oxidizing anodized acid water are supplied from the cathode chamber through an ion-exchange membrane. This supply involves diffusion through the ion-exchange membrane. Such supply provides extremely good dispersion that makes it possible to supply the foregoing essential ingredients into the anolyte uniformly and without causing even a temporary concentration gradient. In other words, the supply of chloride ion and other ingredients to the anode chamber through the ion-exchange membrane and uniform dissolution of these ingredients in the anolyte can be realized much more easily than by directly dissolving hydrochloric acid and other ingredients in the anolyte. This is in contrast to the prior art where only an extremely low concentration of such ingredients can be directly added to the anode chamber.

Furthermore, chloride ion and other ingredients which have passed to the anode chamber through the ion-exchange membrane from the cathode side are selectively used at the anode chamber side of the ion-exchange membrane for producing hypochlorous acid by electrolytic oxidation which causes an increase in ORP. Thus, unlike a conventional apparatus, the apparatus of the present invention is subject to production of chlorine gas only to a small extent.

Moreover, various ingredients and impurities in the hydrochloric acid which have been added to the cathode chamber are subject to selection through the ion-exchange membrane and by action of the electrolytic field. This makes it possible to prevent metallic ions undesirable for cleaning of electronic parts such as semiconductors from entering into the anode chamber.

Various members constituting the electrolytic cell for the production of acid water of the present invention will be described hereinafter.

As described above, the ion-exchange membrane which partitions the electrolytic cell into an anode chamber and a cathode chamber allows for appropriate permeation of additives contained in the catholyte, typically chloride ion and hydrogen ion constituting hydrochloric acid, through the ion-exchange membrane and into the anode chamber at a constant rate. The ion-exchange membrane is selected depending on other electrolytic conditions and the desired acid water. The ion-exchange membrane may either be an anion-exchange membrane or a cation-exchange membrane. The ion-exchange membrane for use herein may be selected from membranes permeable to acid and chloride ion taking into account the foregoing electrolytic conditions such as hydrochloric acid concentration at the cathode side. Furthermore, hypochlorous acid ion, which is a strong oxidizer, is produced at the anode in the vicinity of the ion-exchange membrane. Therefore, a fluororesin-based ion-exchange membrane having strong resistance to oxidizing agents is desirable. However, a fluororesin-based ion-exchange membrane can hardly function as an anion-exchange membrane. In this case, the foregoing anion-exchange membrane may be overlapped with a fluororesin-based cation-exchange membrane resistant to oxidation, or may be coated with a fluororesin-based ion-exchange membrane at the anode side thereof to inhibit oxidation.

The ion-exchange member is arranged in the electrolytic cell as a diaphragm. An anode is disposed in close contact with the ion-exchange membrane at the anode chamber side thereof. In this arrangement, the ion-exchange membrane substantially functions as a solid electrolyte. For example, this arrangement allows the passage of current in an amount as large as 10 $A/dm^2$, and makes it possible to stably maintain the electrolytic voltage at an extremely low value. Furthermore, the apparatus of the present invention employs as an anolyte tap water, de-ionized water or ultrapure water containing little or no electrolyte. Even if such an electrolytic solution having a low electric conductivity is used, it has little or no impact on the effectiveness of the apparatus because the ion-exchange membrane acts as a solid electrolyte. Furthermore, because the electrolyte as an additive passes through the ion-exchange membrane from the cathode chamber to reach the anode chamber, the electrolyte concentration is greatest at the surface of the ion-exchange membrane. This makes it possible to maintain the current efficiency at a high value.

The anode material is not specifically limited so long as it is acid-resistant. Known electrode materials, e.g., platinum-plated titanium, may be used. If contamination by materials eluted from the electrode is undesirable, the use of a dimensionally stable electrode (DSE) comprising a titanium substrate coated with an iridium oxide-based material which has little tendency to elute is effective. With regard to the form of the titanium substrate, an expanded mesh-like, perforated plate-like or porous sintered titanium is preferably used to allow thorough permeation of liquids and the electrolysis product.

The cathode may be disposed at some distance from the ion-exchange membrane as in the prior art because the catholyte contains sufficient electrolytes and therefore has a high electric conductivity. In practice, however, the cathode is preferably disposed in close contact with the ion-exchange membrane as in the case of the anode for the purpose of lowering the required applied voltage. The cathode material is not specifically limited. In practice, however, it can be selected from the group consisting of materials having sufficient resistance to hydrochloric acid, e.g., metals belonging to the platinum group such as platinum and palladium and gold, taking into account the fact that it is dipped in an electrolyte mainly composed of hydrochloric acid, though at a relatively low temperature. Such noble metals may be worked into a fine wire which is knitted into a net. Although noble metals are expensive, they can be knitted into a net that provides an electrode having a large surface area for a small amount of material.

Besides these noble metals, carbon such as graphite which has heretofore been used may be used as a cathode material. However, because carbon tends to break as it is used, carbon cathode materials are preferably impregnated with a fluororesin or otherwise treated to inhibit this phenomenon. Besides carbon, a corrosion-resistant metal such as titanium, zirconium, niobium, tantalum and alloys thereof, or a nickel chrome alloy such as Hastelloy may be used. If the acid water thus produced needs to have a particularly high purity, e.g., for the cleaning of electronic parts, noble metals or carbon, which are hardly eluted, are desired among these cathode materials.

If an electrolytic cell for the production of acid water of the present invention having the foregoing constitution is used to produce acid water, it is energized while the cathode chamber is being supplied with an aqueous solution of hydrochloric acid and the anode chamber is being supplied with raw water such as tap water, deionized water or ultrapure water depending on the intended purpose. The hydrochloric acid concentration is not specifically limited but is preferably from 10 to 15 wt %. If the hydrochloric acid concentration falls below 10 wt %, the volume that must be supplied is too great. On the contrary, if the hydrochloric acid concentration exceeds 15 wt %, the aqueous solution has a hydrochloric acid concentration that is difficult to handle.

Depending on the kind of the ion-exchange membrane that is used, as electrolysis continues, electric charge normally transports while mobile water transports from the anode chamber to the cathode chamber. This causes an increase in the amount of liquid in the cathode chamber. However, the transport water is extremely slight as compared with the amount of the anolyte. Therefore, even if the transport water is returned to the anolyte, it has little or no effect on the quality of acid water produced in the anode chamber.

The production of acid water will be further described hereinafter.

For example, if acid water for ordinary disinfection is to be produced at a rate of 3 l/min, electrolysis can be effected with a Nafion 117, which is a fluororesin-based cation exchange membrane, as an ion-exchange membrane. A 10 wt % aqueous solution of hydrochloric acid is circulated as a catholyte through the cathode chamber, and tap water is passed through the anode chamber at a rate of about 3 l/min. The amount of electric current required to provide an ORP of not lower than 1,000 mV is from 10 to 20 A. The electrolytic voltage required for electrolysis at a current density of 10 A/dm$^2$ with a mesh woven from platinum wire pressed against both sides of the ion-exchange membrane as a cathode and an anode, respectively, is from 4 to 5 V. Thus, the consumed power is from 40 to 100 W. The required electrode surface area may be from 100 to 200 cm$^2$. Under these conditions, the ORP and pH values of the acid water thus produced is from 1,000 to 1,100 mV and from 2.5 to 3, respectively. The transport of water is about two molecules per unit electric charge or about 25 ml per hour, namely, about 0.1% per 180 l (=3 (l/min)×60 min.) of raw water, which is almost negligible. Even if purity is taken into account, this amount can be treated as overflow. In order to control the pH, the aqueous solution of hydrochloric acid as a catholyte may be partially passed to the anode chamber.

The current density can easily be raised from the above defined value, namely, 10 A/dm$^2$. However, the migration of acid from the cathode chamber to the anode chamber is insufficient at such a high current density, thus making it difficult to sufficiently lower the pH value. In that case, the desired object can be accomplished by properly selecting the kind of ion-exchange membrane (e.g., using an anion exchange membrane having a low ion exchange capacity). The prior art electrolytic cell for the production of acid water produces alkaline in the cathode chamber and is disadvantageous in that an alkaline earth metal salt and other salts are deposited on the surface of the diaphragm and cathode. On the other hand, the electrolytic cell according to the present invention is kept entirely acidic and thus causes no precipitation.

FIG. 1 is a schematic longitudinal sectional view illustrating an embodiment of the electrolytic cell for the production of acid water according to the present invention.

An electrolytic cell main body 1 is partitioned by an anion exchange membrane 2 as a diaphragm into an anode chamber 3 and a cathode chamber 4. An anode 5 made of platinum-plated titanium or the like is disposed in close contact with the anion exchange membrane 2 on the anode chamber side thereof, while a cathode 6 woven out of fine platinum wire is disposed in close contact with the anion exchange membrane 2 on the cathode chamber side thereof.

Ultrapure water as raw water is supplied to the anode chamber 3 at a flow rate set by a valve 7 and a flowmeter 8. An aqueous solution of hydrochloric acid which has been stored in a catholyte reserve tank 9 is supplied to the cathode chamber 4 by the action of a pump 10. A voltage is applied across the anode 5 and the cathode 6 to effect electrolysis.

The hydrochloric acid which has been supplied to the cathode chamber 4 permeates through the ion-exchange membrane 2 as chloride ion to reach the anode chamber 3 where it is then anodized mainly on the surface of the anode 5 which contacts the ion-exchange membrane 2 to produce hypochlorous acid ion that raises the ORP. This hypochlorous ion and unoxidized chloride ion are spontaneously diffused all over the anolyte to obtain a uniform anolyte. On the other hand, hydrogen ion derived from hydrochloric acid in the cathode chamber 4 permeates through the ion-exchange membrane 2 to reach the anode chamber 3 where it contributes to a decrease in pH to produce a strongly acidic water.

The strongly acidic water thus produced is output from the anode 3 through a pipe running from the top of the anode 3. The pH value of the strongly acidic water is detected by a pH controller 11 connected to the pipe. When the pH value thus detected shows an insufficient decrease, the hydrochloric acid concentration in the cathode chamber is raised or an acid is added to the cathode chamber to provide a strongly acidic water having the desired pH value.

The cathode chamber contains a catholyte having a hydrochloric acid concentration that is reduced by electrolysis and hydrogen gas. A mixture of these components is withdrawn from the cathode chamber 4 through a pipe running from the top of the cathode chamber 4, and then separated by a vapor-liquid separator 12 into hydrogen and an electrolytic solution which is then recycled to the catholyte reserve tank 9.

Figure 2:
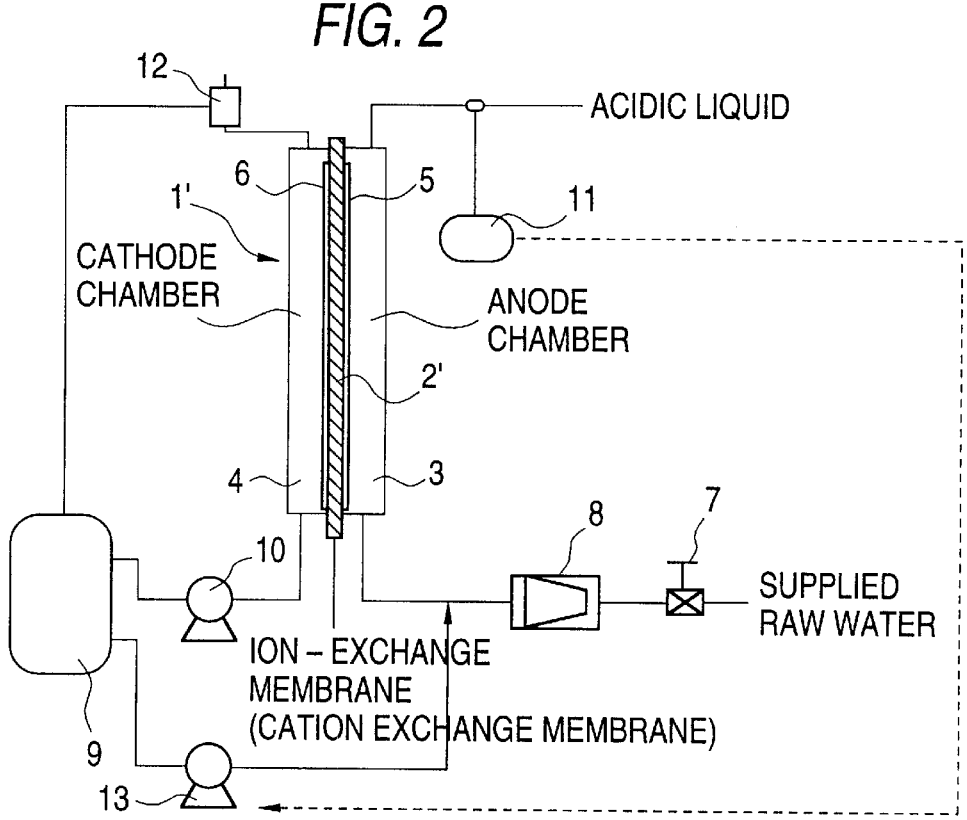
FIG. 2 is a schematic longitudinal sectional view illustrating another embodiment of the electrolytic cell for the production of acid water according to the present invention, wherein the reference numerals 1, 1' each indicate an electrolytic cell main body, the reference numeral 2 indicates an anion exchange membrane, the reference numeral 2' indicates a cation exchange membrane, the reference numeral 3 indicates an anode chamber, the reference numeral 4 indicates a cathode chamber, the reference numeral 5 indicates an anode, the reference numeral 6 indicates a cathode, the reference numeral 7 indicates a valve, the reference numeral 8 indicates a flowmeter, the reference numeral 9 indicates a catholyte reserve tank, the reference numeral 10 indicates a pump, the reference numeral 11 indicates a pH controller, the reference numeral 12 indicates a vapor-liquid separator, and the reference numeral 13 indicates a constant delivery pump.

FIG. 2 is a schematic longitudinal sectional view illustrating another embodiment of the electrolytic cell for the production of acid water according to the present invention. The apparatus of FIG. 2 is an improvement of the apparatus of FIG. 1. Like numerals are used for like members in FIGS. 1 and 2. The description is omitted where the members are the same as those of FIG. 1.

An electrolytic cell main body 1' employs as a diaphragm a cation exchange member 2' through which chloride ion as an anion can hardly permeate. Accordingly, if the structure of FIG. 1 is used, chloride ion in the cathode chamber can hardly migrate to the anode chamber, thus inhibiting the production of acid water. In the electrolytic cell of FIG. 2, the pH value of acid water that is produced is detected by a pH controller 11. When the pH value thus detected shows an insufficient decrease, an aqueous solution of hydrochloric acid from the catholyte reserve tank 9 is supplied to the pipe for supplying raw water to the anode chamber 3 by the action of a constant delivery pump 13 to make up for the deficiency of hydrochloric acid during electrolysis. In this manner, almost the same effect as exerted by the electrolytic cell of FIG. 1 can be obtained.

Examples of the production of acid water by the electrolytic cell according to the present invention will be described hereinafter, but the present invention should not be construed as being limited thereto.

EXAMPLE 1

Selemion (produced by Asahi Glass Co., Ltd.) was selected as an ion-exchange membrane. The anion exchange membrane was coated with a Nafion solution, which forms a fluorinic ion-exchange resin membrane, on the anode side thereof to enhance its acid resistance. The anion exchange membrane was installed in a 70 mm diameter circular titanium electrolytic cell to provide a two-chamber electrolytic cell. An insoluble metal electrode comprising a 0.2 mm thick expanded titanium mesh coated with a composite oxide of iridium oxide and tantalum oxide was used as an anode. The anode was disposed in close contact with the anion exchange membrane on the anode chamber side thereof. A sintered product of a long titanium fiber was used as an anode collector. The anode collector was connected to the anode. A sintered product of a long titanium fiber was used as such as a cathode. The cathode was disposed in close contact with the ion-exchange membrane in a position corresponding to the anode.

Mounted in the cathode chamber of the electrolytic cell were an electrolytic solution introducing pipe through which an aqueous solution of hydrochloric acid is introduced from the catholyte reserve tank into the cathode chamber by the action of an electromagnetic pump, and a pipe through which the mixture of an electrolytic solution and produced gas is withdrawn. A vapor-liquid separator was connected to the latter pipe. The pipe was connected to the catholyte reserve tank via the vapor-liquid separator.

Connected to the anode side of the electrolytic cell via a flowmeter and an electromagnetic valve was a tap water pipe through which tap water as raw water is supplied to the anode chamber at a maximum flow rate of 3 l/min when switched on. Disposed at the output side of the anode chamber was a pipe for withdrawing an electrolytic solution. Connected to the pipe was a pH controller for monitoring the pH value of the withdrawn electrolyte. Electrolysis was effected at a current of 5 A, while a 10 wt % aqueous solution of hydrochloric acid was being recycled as a catholyte and tap water was flowing as an anolyte at a flow rate of 2 l/min. The water temperature was 25° C. The electrolytic voltage was stabilized at about 4.2 V.

In this manner, acid water having a pH value of from 2.8 to 3.0 and an ORP of from 1,000 to 1,100 mV was produced as an anolyte at a rate of 2 l/min. The anolyte thus produced had a hypochlorous acid concentration of from 2.5 to 3.2 ppm. Electrolysis was continuously effected for 12 hours. As a result, no precipitation was observed in the electrolytic cell. Furthermore, the catholyte reserve tank exhibited a slight rise in liquid level due to the transport of water through the ion-exchange membrane. The increased amount of water was transferred to the anodized acid water to keep the catholyte level constant. Even if hydrochloric acid is added to the acid water, it has no adverse effect on the pH value of the anolyte because a large amount of anolyte is used.

EXAMPLE 2

Electrolysis was effected in the same electrolytic cell as used in Example 1 and in the same manner as in Example 1, except that Nafion 117 was used as the ion-exchange membrane (cation exchange membrane produced by Du Pont) and an expanded zirconium mesh as a cathode was disposed at a distance of 1 mm from the ion-exchange membrane. The distance between the ion-exchange membrane and the cathode was adjusted by interposing a fluororesin mesh therebetween. In the present example using a cation exchange membrane, where hydrochloric acid is diffused into the anode side to a lesser extent than with an anion exchange membrane, catholyte was transferred to the anode chamber by the action of a constant delivery pump operating in response to operation of the pH controller.

Electrolysis was effected under the same conditions as in Example 1. As a result, the electrolytic voltage was from 5.5 to 6 V. At the anode side, a strongly acidic water having a pH value of from 2.7 to 3.0 and an ORP of from 1,000 to 1,100 mV was produced at a rate of 2 l/min. Electrolysis was continuously effected for 12 hours. As a result, no precipitation was observed in the electrolytic cell. The catholyte concentration exhibited little or no change even after continuous operation. The loss of catholyte concentration was made up for by the addition of hydrochloric acid having a concentration of from 11 to 12 wt % to keep the electrolysis stable.

The present invention concerns an electrolytic cell for the production of acid water, which performs electrolysis by applying a voltage across an anode chamber and a cathode chamber partitioned by an ion-exchange membrane. The anode of the anode chamber is in close contact with the ion-exchange member. An aqueous solution of hydrochloric acid and water are supplied to the cathode chamber and the anode chamber, respectively, to produce an oxidizing acid water containing hypochlorous acid in the anode chamber.

In the present invention, hydrochloric acid used in the production of acid water is not directly added to the anolyte, but is added to the catholyte from which it is then indirectly added to the anode chamber by diffusing through an ion-exchange membrane used as a diaphragm. Accordingly, this arrangement eliminates the complicated procedure of calculating the amount of hydrochloric acid to be added to the anolyte, which addition must be carefully made to prevent the generation of a concentration gradient. Thus, by only using an aqueous solution of hydrochloric acid as a catholyte, the desired acid water can be obtained.

Furthermore, chloride ion and other ingredients which reach the anode chamber from the cathode chamber are spontaneously diffused all over the anolyte. Thus, no concentration gradient occurs even momentarily, making it extremely easy to obtain acid water having a uniform concentration.

Moreover, the anolyte and the catholyte of the electrolytic cell for the production of acid water according to the present invention are invariably kept acidic. Therefore, the electrolytic cell for the production of acid water according to the present invention is not liable to precipitate alkaline earth metal salts under alkaline conditions, which is a great problem with similar apparatus of the prior art. Thus, countermeasures against precipitation are not required.

The ion-exchange membrane for use in the present invention is preferably an anion exchange membrane. The use of such an anion exchange membrane allows smooth migration of chloride ion from the cathode chamber to the anode chamber.

While the invention has been described in detail and with reference to specific embodiments thereof, it will be apparent to one skilled in the art that various changes and modifications can be made therein without departing from the spirit and scope thereof.

What is claimed is:

1. An electrolytic cell for the production of acid water, which comprises an ion-exchange membrane partitioning the electrolytic cell into a cathode chamber containing a cathode and an anode chamber containing an anode disposed in close contact with said ion-exchange membrane, a power supply for applying a voltage across the anode chamber and the cathode chamber, a catholyte reserve tank for supplying an aqueous solution of hydrochloric acid to said cathode chamber, means for supplying water to said anode chamber, means for withdrawing catholyte from the cathode chamber, a vapor-liquid separator for separating withdrawn catholyte into an electrolytic solution and a gas, and means for recycling the electrolytic solution to the catholyte reserve tank.

2. The electrolytic cell for the production of acid water according to claim 1, wherein said ion-exchange membrane comprises an anion-exchange membrane.

3. The electrolytic cell for the production of acid water according to claim 1, further comprising means for withdrawing anolyte from the anode chamber, and a pH controller for monitoring the pH of the withdrawn anolyte and adjusting the pH of the anolyte by adding additional acid to said cathode chamber.

4. The electrolytic cell for the production of acid water according to claim 3, comprising means for increasing the hydrochloric acid concentration of the catholyte.

5. The electrolytic cell for the production of acid water according to claim 1, further comprising means for maintaining a constant amount of catholyte in said cathode chamber.

6. The electrolytic cell for the production of acid water according to claim 5, comprising means for recycling excess catholyte to said anode chamber.

7. An electrolytic cell for the production of acid water, which comprises an anion-exchange membrane partitioning the electrolytic cell into a cathode chamber containing a cathode and an anode chamber containing an anode disposed in close contact with said anion-exchange membrane, a power supply for applying a voltage across the anode chamber and the cathode chamber, a catholyte reserve tank for supplying an aqueous solution of hydrochloric acid to said cathode chamber, means for supplying water to said anode chamber, means for withdrawing catholyte from the cathode chamber, a vapor-liquid separator for separating withdrawn catholyte into an electrolytic solution and a gas, means for recycling the electrolytic solution to the catholyte reserve tank, means for withdrawing anolyte from the anode chamber, and a pH controller for monitoring the pH of the withdrawn anolyte and adjusting the pH of the anolyte by adding additional acid to said cathode chamber.

8. An electrolytic cell for the production of acid water, which comprises a cation-exchange membrane partitioning the electrolytic cell into a cathode chamber containing a cathode and an anode chamber containing an anode disposed in close contact with said cation-exchange membrane, a power supply for applying a voltage across the anode chamber and the cathode chamber, a catholyte reserve tank for supplying an aqueous solution of hydrochloric acid to said cathode chamber, means for adding an acid to said anode chamber, means for supplying water to said anode chamber means for withdrawing catholyte from the cathode chamber, a vapor-liquid separator for separating withdrawn catholyte into an electrolytic solution and a gas, and means for recycling the electrolytic solution to the catholyte reserve tank.

9. The electrolytic cell for the production of acid water according to claim 8, further comprising means for withdrawing anolyte from the anode chamber, and a pH controller for monitoring the pH of the withdrawn anolyte and adjusting the pH of the anolyte by adding aqueous hydrochloric acid solution to the anode chamber from said catholyte reserve tank.

* * * * *